Feb. 11, 1958     K. SHREEDHARAN     2,822,636
ORNAMENTAL LAMINATED ARTICLE
Original Filed Dec. 3, 1948     3 Sheets-Sheet 1
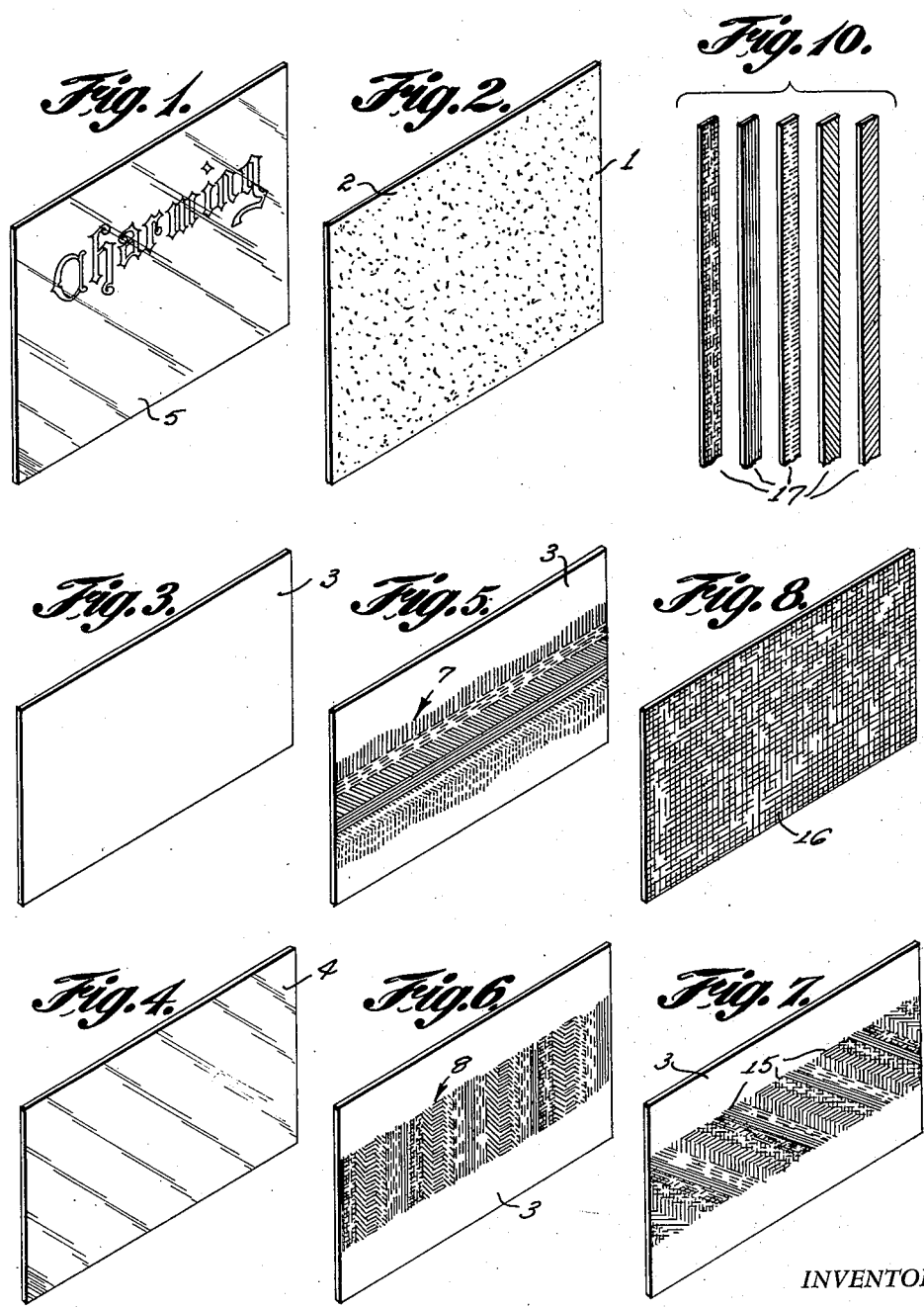
INVENTOR.
Kallady Shreedharan
BY Victor J. Evans & Co.
ATTORNEYS Feb. 11, 1958 K. SHREEDHARAN 2,822,636
ORNAMENTAL LAMINATED ARTICLE
Original Filed Dec. 3, 1948 3 Sheets-Sheet 2
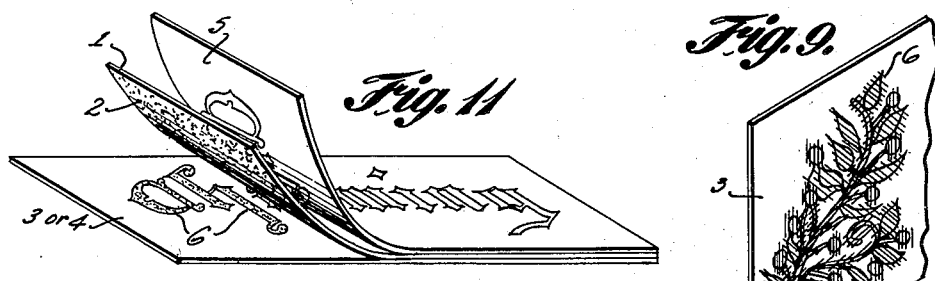
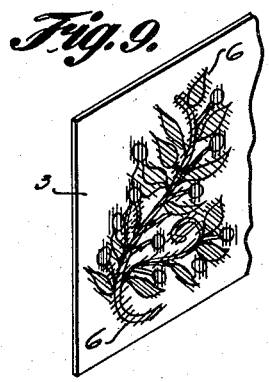
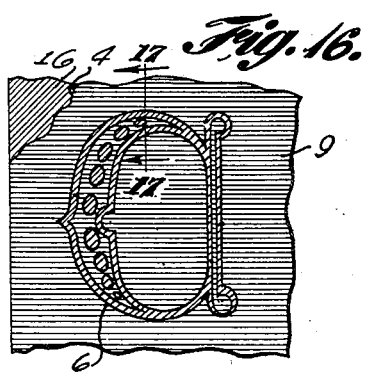
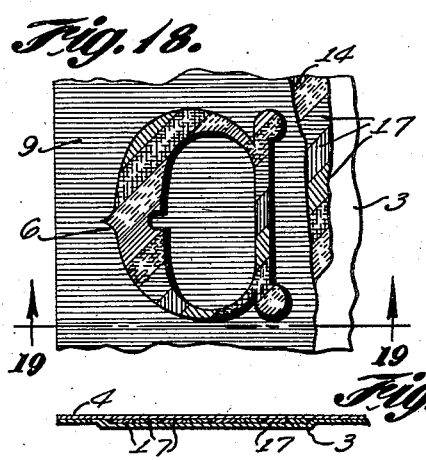
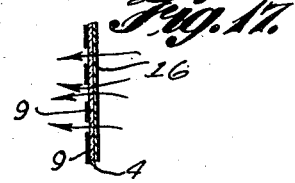
INVENTOR.
*Kallady Shreedharan*
BY *Victor J. Evans & Co.*
ATTORNEYS

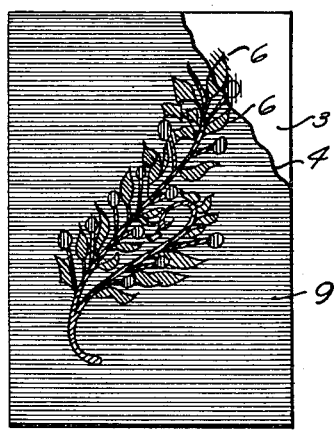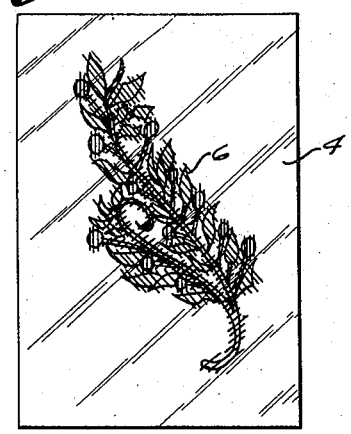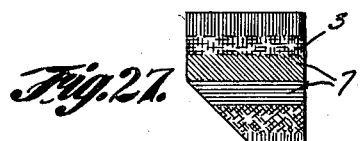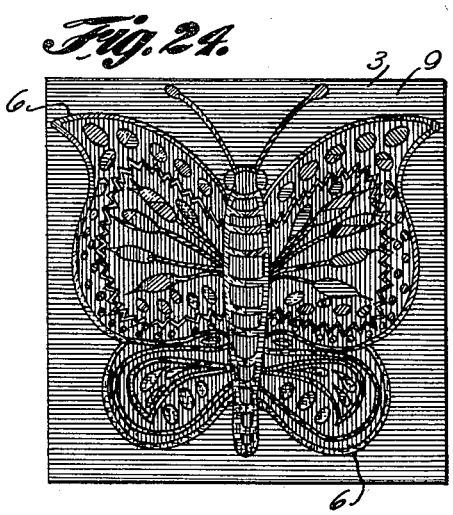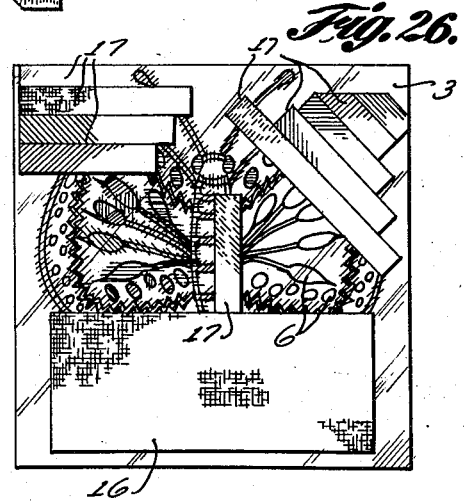
INVENTOR.
*Kallady Shreedharan*
ATTORNEYS

United States Patent Office 2,822,636
Patented Feb. 11, 1958

2,822,636
ORNAMENTAL LAMINATED ARTICLE

Kallady Shreedharan, Malacca, Malaya

Original application December 3, 1948, Serial No. 63,377, now Patent No. 2,662,325, dated December 15, 1953. Divided and this application September 16, 1953, Serial No. 380,633

1 Claim. (Cl. 41—22)

This invention relates to an ornamental or laminated article.

This invention is a divisional application of my parent application, Serial No. 63,377, now Patent No. 2,662,325, filed December 3, 1948, for Exposition Water Color Process.

The present invention is directed to the ornamental or laminated article per se, and by the utilization and variations in the steps of the present invention, and without requiring the use of chemicals, originals are produced by exposing in a uniform layer of a suitable opaque pigment in a water vehicle the required line-forms for the facile working of a color scheme that is capable of producing novel originals in water color painting.

A recorded original may artistically be built up and finished upon an opaque, transparent, or translucent backing or base, for a card, having a smooth surface that is adapted to receive and record an impression in wax-lines or forms created by the use of a stylus, or stencil, from a waxed transfer sheet. The wax impressions, lines, or forms may also be created by tracing, with a stylus, an original design or symbol, through the waxed transfer sheet to the backing; and a brush, usually by single strokes is employed to lay various colors of an opaque pigment, or water color, upon the cero-graphed surface of the backing or base.

The invention consists essentially in an artistic creation of a color process based upon the non-miscibility or non-mixing of oil and water, and in which an oily wax transfer sheet, as of paper, is employed in transferring or translating cero-lines or forms to a receiving sheet or backing, and the cero-lines are subsequently exposed to view by brushing on the backing a coating of suitable water-soluble color or colors. Various shades or tints of metallic sheets, or strips of foil, as silver, may be applied to the base or backing to coact with the cero-lines and water colors in producing high lights in an ensemble. By this means the finished artistic creation may have a luminous white or bright surface; a glazed surface; a surface having mild and metallic lustrous lines as well as a brilliant metallic lustre; and plain or colored lights may be employed to illuminate the exposed cero-lines.

In the accompanying drawings I have disclosed a complete example of a physical embodiment of the steps in my color process, but it will be understood that changes and alterations are contemplated, and may be made in these steps, within the scope of my appended claim, without departing from the principles of the invention.

In the drawings:

Figure 1 is a perspective view showing an original sheet of tracing paper bearing the word "charming" to be reproduced and colored.

Figure 2 is a perspective view of a transfer sheet of thin paper coated with hard wax or other oily substance.

Figure 3 is a perspective view of a backing sheet or base having a plain or glossed surface.

Figure 4 shows a backing sheet of transparent paper, as cellophane; or this may be a translucent paper.

Figures 5 and 6 show backing sheets or bases having different water colors thereon for use in the process.

Figure 7 is a backing sheet bearing another arrangement of the water colors.

Figure 8 shows a metallic foil, as of gold, for use in the process.

Figure 9 shows a portion of a card having a design with various water colors roughly applied thereto.

Figure 10 illustrates a series of strips of metallic foil of variegated colors, for selective use in the process.

Figure 11 shows the relation of the backing sheet of Fig. 3, the waxed transfer sheet of Fig. 2, and the transparent sheet of tracing paper in Fig. 1.

Figure 12 shows the completed "charming" card including the backing sheet of Fig. 3, finished in opaque water paint or colors; and Figure 13 is an edge view of this card.

Figure 14 hows a portion of a "charming" card including a transparent (or a translucent) backing sheet as in Fig. 4, finished in water colors of Figs. 5, 6, and 7, or metallic sheets as in Fig. 8.

Figure 15 is an edge view of the card in Fig. 14 showing the use of the transparent sheet of Fig. 4 mounted on the backing sheet of Fig. 3, and provided with water colors as in Figs. 5, 6, 7, and 8.

Figure 16 shows a portion of a card bearing the letter C, and made up of layers of transparent paper or foil, cero-lines, opaque water paint, and indicating by arrows in Fig. 17 the transmission of light through transparent spaces; and Fig. 17 is an enlarged sectional detail view at line 17—17 of Fig. 16.

Figure 18 shows a card including a backing sheet, the foil strips of Fig. 10, and shading of opaque paint colors or pigment; and Figure 19 is a sectional view at line 19—19 of Fig. 18.

Figure 20 is a view of the card and design shown in Fig. 9 covered by the transparent (or translucent) sheet Fig. 4, with the brown, green and red colors properly finished; Fig. 21 is an edge view of this card.

Figure 22 discloses the transparent sheet of Fig. 4 and the painted colors on the back of the sheet behind wax lines; and Figure 23 is an edge view of this card.

Figure 24 depicts a card bearing a butterfly design in the colored foil strips of Fig. 10, upon the transparent sheet of Fig. 4; and Figure 25 is an edge view of this card.

Figure 26 is a view of the back of the card in Fig. 24 with the backing sheet and certain parts removed; and Figure 27 is a detail of the part shown in Fig. 5 cut for use in the design of Fig. 26.

As one complete example of my present invention in the production of a sample card illustrated in Figs. 1 through 14, for depicting the steps in reproducing the ornamental color scheme from an original word "charming," I employ a thin transfer sheet of paper 1 faced with a coating 2 of hard oily wax applied to the sheet, from which cero-lines, or wax lines will be made having the required oil consistency to repel water, and thereby prevent adhesion of the paint pigments carried in the water colors.

This waxed transfer sheet 1 is placed, waxed face down, upon a second sheet 3 as a backing or base having preferably a plain or a glossed surface, as in Fig. 3; or a backing sheet 4 in Fig. 4 may be translucent or transparent, upon which the word "charming," is to be defined by an opaque water color.

An original tracing sheet, as of transparent paper 5 in Fig. 1, and bearing the word to be reproduced is now laid over the back of the inverted waxed sheet 1, and a comparatively blunt stylus or scriber, or other suitable instrument, is manually employed in tracing the letters of the original and thus transferring the letters and reproducing them in cero-lines, or wax lines, as 6, upon the base or backing sheet 3 or upon the transparent sheet 4. The wax lines are designated by the numeral 6 throughout the drawings.

The tracing sheet is now removed, together with the waxed transfer sheet, from the backing sheet leaving the cero-lines or letters outstanding on the base or backing sheet, and a body color, or colors, as a water color coating is applied by strokes of a brush to the backing or base. The various body colors are indicated as 7 in Fig. 5, or as 8 in Fig. 6, or as 15 in Fig. 7, and in Fig. 12 an opaque water color, as 9, is illustrated.

The color, or multi-colors are quickly applied with strokes of a brush, and the water paint is thus spread evenly and smoothly to insure a uniform body thickness of paint upon the base, without however coating the cero-lines or letters with the paint, and thus preventing adhesion of the paint pigments to the wax letters.

Inasmuch as the present invention is based upon the non-miscibility, non-mixing of oil in the opaque water colors with the wax of the letters or cero-lines, the failure of the pigments to adhere to the wax letters causes these letters or cero-lines to be exposed and brought into view with distinct clarity upon the card of Fig. 12 and in contrast to the body color of the card.

In Fig. 14 a portion of the "charming" card is shown with a transparent finishing sheet 4, as of cellophane, superimposed upon the base or backing 3, as a protective cover for the vari-colored paints or pigments at 7, 8, and 15 in Figs. 5, 6, and 7. Or, if desired, a sheet of gold foil, as 16 in Fig. 8 may be covered by this transparent sheet 4.

Figs. 9, 20 and 22 disclose the process in which Valex water colors are employed in preparing the surface of the backing or base sheet for exposing to view a plant bearing red fruit or berries, green leaves, and green stems. The roughly prepared design shown in Fig. 9 is painted upon the backing sheet 3, Fig. 3 and Fig. 22 shows the design upon the back of a transparent base sheet as 4 in Fig. 4. In the completed card of Fig. 20, after the necessary line-forms of wax have been recorded on the required spots and spaces, they have been exposed to view by brushing a uniform layer or coating of opaque pigment, or water-color. The transparent rough colors in Fig. 9 have been trimmed to insure and expose exact lines, forms and designs, to the sight.

In Figure 20 there is shown a card and design of Figure 9 which may be covered by a transparent sheet such as the sheet of Figure 4 with the brown, green and red colors finished. In Figure 21 there is shown an edge view of this card while Figure 22 shows the transparent sheet of Figure 4 with the painted colors on the back of the sheet behind the wax line. In Figure 23 there is shown an edge view of this case and in Figure 24 there is shown a card having a design of a butterfly in colored foil strips, Figure 25 showing an edge view of this card.

The numeral 17 designates strips of suitable material which can be used with the present invention.

In Figs. 24, 25, 26, and 27, there is shown a transparent sheet having thereon a butterfly design which is formed by a combination of the elements shown in previous figures.

I claim:

An ornamental laminated article comprising a sheet of translucent paper base with variegated hues of transparent water colors thereover arranged in a meandering fashion, cero-graphed line-forms super-posed over said colors, a layer of opaque pigment dissolved in a water vehicle for imparting a desired appearance to the exposed line forms, a further super-imposition of opaque water colors of a contrasting nature, and a sheet on the reverse side of the finished article for imparting a luster in a vari-color manner to the exposed line forms.

References Cited in the file of this patent

UNITED STATES PATENTS

| | | |
|---|---|---|
| 1,819,264 | Ranger | Aug. 18, 1931 |
| 2,270,177 | Vawryk | Jan. 13, 1942 |
| 2,273,568 | Fishel | Feb. 17, 1942 |
| 2,288,073 | Davis | June 30, 1942 |
| 2,662,325 | Shreedharan | Dec. 15, 1953 |